US012479897B2

(12) United States Patent
Lee et al.

(10) Patent No.: US 12,479,897 B2
(45) Date of Patent: Nov. 25, 2025

(54) THERMALLY STABLE FGF7 POLYPEPTIDE AND USE OF THE SAME

(71) Applicant: Korea Institute of Ocean Science & Technology, Busan (KR)

(72) Inventors: Jung-Hyun Lee, Busan (KR); Hyung-Soon Yim, Seoul (KR); Young Jun An, Ansan-si (KR); Kyeong Won Lee, Busan (KR); Ye Eun Jeong, Busan (KR); Kiweon Cha, Cheongju-si (KR); Won Kyu Lee, Goyang-si (KR)

(73) Assignees: KOREA INSTITUTE OF OCEAN SCIENCE & TECHNOLOGY, Busan (KR); OSONG MEDICAL INNOVATION FOUNDATION, Cheongju-si (KR)

( * ) Notice: Subject to any disclaimer, the term of this patent is extended or adjusted under 35 U.S.C. 154(b) by 0 days.

(21) Appl. No.: 18/147,796

(22) Filed: Dec. 29, 2022

(65) Prior Publication Data
US 2023/0287073 A1    Sep. 14, 2023

(30) Foreign Application Priority Data

Feb. 25, 2022    (KR) ......................... 10-2022-0025352

(51) Int. Cl.
*C07K 14/50*    (2006.01)
(52) U.S. Cl.
CPC .................................... *C07K 14/50* (2013.01)
(58) Field of Classification Search
CPC ...................................................... C07K 14/50
See application file for complete search history.

(56) References Cited

U.S. PATENT DOCUMENTS 7,265,089 B2 *   9/2007   Gospodarowicz ........ A61P 1/04
                                                          514/8.7

FOREIGN PATENT DOCUMENTS

| JP | H10-507452 | 7/1998 |
| JP | 2007-20575 | 2/2007 |

OTHER PUBLICATIONS

Osslund et al., Correlation between the 1.6 A crystal structure and mutational analysis of Keratinocyte Growth Factor, Protein Science; 7: 1681-1690 (Year: 1998).*
Kegg Drug: Palifermin: examiner generated pdf from https://www.genome.jp/dbget-bin/www_bget?D05338 (Year: 2004).*
Lee and Blaber, Structural Basis of Conserved Cysteine in the Fibroblast Growth Factor Family: Evidence for a Vestigial Half-Cystine, J. Mol. Biol.; 393: 128-139 (Year: 2009).*
Lee et al., Protein Thermal Stability Enhancement by Designing Salt Bridges: A Combined Computational and Experimental Study, PLOSONE; 9(11): e112751 (Year: 2014).*
An et al. "Improvement of FGF7 Thermal Stability by Introductions of Mutations in Close Vicinity to Disulfide Bond and Surface Salt Bridge" International Journal of Peptide Research and Therapeutics 28:85. (Year: 2022).*
Boris Greber et al., "Fibroblast growth factor 2 modulates transforming growth factor ß signaling in mouse embryonic fibroblasts and human ESCs (hESCs) to support hESC self-renewal" 1. Stem Cells 25.2 (Oct. 12, 2006): 455-464.
Livia Eiselleova et al., "A complex role for FGF-2 in self-renewal, survival, and adhesion of human embryonic stem cells" Stem Cells 27.8 (May 14, 2009): 1847-1857.
Oluseun Adewumi et al., "Characterization of human embryonic stem cell lines by the International Stem Cell Initiative" Nature biotechnology 25.7 (Jun. 17, 2007): 803-816.
Miriama Krutá et al., "Mutation frequency dynamics in HPRT locus in culture-adapted human embryonic stem cells and induced pluripotent stem cells correspond to their differentiated counterparts" Stem Cells and development 23.20 (May 17, 2014): 2443-2454.
Hsu, Eric, et al. "Enhanced stability of recombinant keratinocyte growth factor by mutagenesis." Protein Engineering Design and Selection 19.4 (Feb. 14, 2006): 147-153.
An, Young Jun, et al. "Improvement of FGF7 Thermal Stability by Introduction of Mutations in Close Vicinity to Disulfide Bond and Surface Salt Bridge." International Journal of Peptide Research and Therapeutics 28:85 (Mar. 29, 2022): pp. 1-12.
JPO, Office Action of the corresponding Japanese Patent Application No. 2022-212265 dated Nov. 17, 2023.

* cited by examiner

*Primary Examiner* — Sudhakar Katakam
*Assistant Examiner* — Zachary J Miknis
(74) *Attorney, Agent, or Firm* — LEX IP MEISTER, PLLC

(57)    ABSTRACT

A thermally stable polypeptide having FGF7 activity is provided. The polypeptide is a thermally stable polypeptide having FGF7 activity, wherein, in SEQ ID NO: 1, a 120th alanine (A) is substituted with cysteine (C), one including at least one substitution selected from substitution of a 126th lysine (K) with aspartic acid (D) and a 178th lysine (K) with glutamic acid (E) or aspartic acid (D) forms a salt bridge with a 175th arginine (R), and a 133rd cysteine (C) and a 137th cysteine (C) are disulfide bonded.

4 Claims, 12 Drawing Sheets

Specification includes a Sequence Listing.

FIG. 1

SEQ ID NO : 1

```
      10         20         30         40         50         60
MKWVTFISLL PTLVRSQFH TDLVGTTSL ACHDMTPEQM ATVHCSSPE AHTRSYDYME
      70         80         90        100        110        120
GGDIRVRRLF ORTCWVLRID KRGKVKGTQE MKNNYNIMEI RTVAVGIVAI KGVESEFYLA
     130        140        150        160        170        180
MNKEGKLYAK KECNEDCNFK ELILENHYNT YASAKWTHNG GEMFVALNSK GIPVRGKKTK
     190
KEQKTAHFLP MAIT
```

FIG. 2

SEQ ID NO : 2

← pCold vector site →
MNHKVHHHHHHIEGRHMSYDME  60
GGDIRNARLF CRTCWYLRID NRGNWGTCE MKNINYHIMEI RTVAVGIVAI KGVESEFYLA  120
MNKEGWLYAK KEGWEGONFK ELILEWNYNT YASAWTHNG GENFVALNDK GIPVAGNKTK  180
KEGWTAHFLP MAIT  190

THERMALLY STABLE FGF7 POLYPEPTIDE AND USE OF THE SAME

REFERENCE TO AN ELECTRONIC SEQUENCE LISTING

The contents of the electronic sequence listing (Size: 4,205 bytes; and Date of Creation: Oct. 7, 2024) is herein incorporated by reference in its entirety. The contents of the electronic sequence listing in no way introduces new matter into the specification.

TECHNICAL FIELD

This disclosure relates to a thermally stable FGF7 polypeptide and a use of the same.

BACKGROUND ART

FGF (Fibroblast Growth Factor) is a factor that plays an important role in regulating cell growth, proliferation, and differentiation. Various types of FGFs are generated to maintain the function of each tissue in the human body, and they perform unique functions in cell differentiation and proliferation. However, as aging progresses, a concentration of FGFs in each tissue, such as the skin, is gradually lowered, and accordingly cell regeneration and division functions are weakened, so that wrinkles may be formed in the skin and elasticity may be reduced.

Among FGFs, FGF7 (Fibroblast Growth Factor 7), which is called a keratinocyte growth factor, is known as a strong epithelial cell-specific growth factor in mammalian cells. In addition, FGF7 plays an important role in regulating skin regeneration, cell proliferation, and cell differentiation.

FGF7 is being widely used as a cosmetic raw material for skin regeneration, wrinkle removal, or elasticity increase as well as being already carried on the market as a treatment for stomatitis after radiation therapy and developed as a medicine to promote wound healing.

FGF families such as FGF1, FGF2, FGF7, and FGF10 have been reported to rapidly lose activity at room temperature or higher due to very low stability to temperature, and thus exhibit a severe activity loss when left in an aqueous solution state for 24 hours.

Accordingly, in order to appropriately use FGF7 having various functions in the human body for industrial purposes, it is essential to secure thermodynamic stability of FGF7.

DISCLOSURE

The present disclosure provides a thermally stable FGF7 polypeptide.

The present disclosure provides a pharmaceutical or cosmetic composition including the thermally stable FGF7 polypeptide.

A thermally stable polypeptide having improved temperature stability compared to wild type human FGF7 polypeptide has an amino acid sequence of SEQ ID NO: 28.

Each of a $73^{rd}$ glutamic acid (E) and a $125^{th}$ glutamic acid (E) form a salt bridge with a $122^{nd}$ arginine (R), and a $80^{th}$ cysteine (C) and $84^{th}$ cysteine (C) are disulfide bonded in SEQ ID NO:28.

A composition according to example embodiments includes the thermally stable polypeptide and a pharmaceutically or cosmetically acceptable carrier.

The FGF7 polypeptide according to example embodiments exhibits improved temperature stability, compared with a wild-type human FGF7 polypeptide.

The polypeptide with improved thermal stability may maintain activity during distribution and storage unlike the conventional wild-type human FGF7 products. Accordingly, this polypeptide may be used as an active ingredient for pharmaceutical or cosmetic compositions.

DESCRIPTION OF THE DRAWINGS

FIG. 1 shows a polypeptide (SEQ ID NO: 1) of wild-type FGF7.

FIG. 2 shows a polypeptide (SEQ ID NO: 2) in which $2^{nd}$ to $54^{th}$ amino acids are deleted from wild-type FGF7 (SEQ ID NO:1) and which includes a pCold I site.

MODE FOR INVENTION

Figure 3:
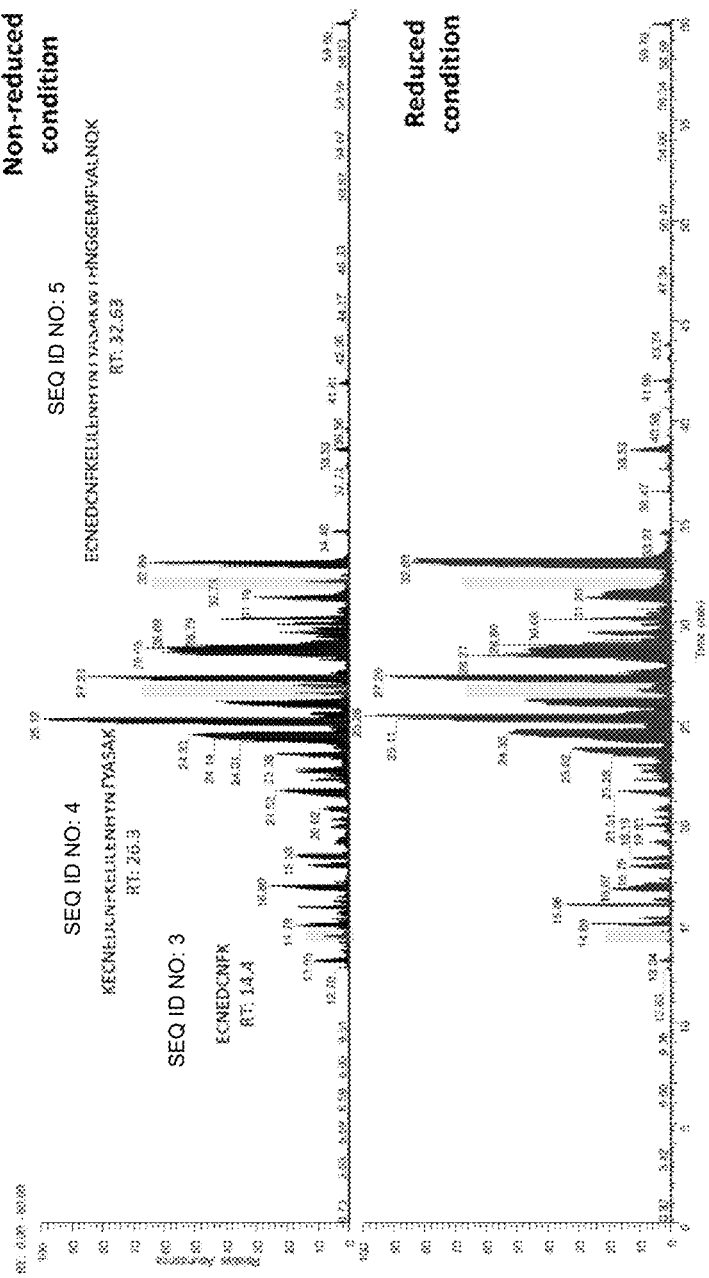
FIG. 3 shows the base peak chromatograms obtained for reduced and non-reduced samples (SEQ ID NO: 3, SEQ ID NO: 4, and SEQ ID NO: 5)

Hereinafter, the embodiments will be described in detail so that those skilled in the art can easily perform the embodiments. The embodiments may be implemented in various different forms, and the present disclosure is not limited only to the specific embodiments described herein.

Unless the definition of some terms used in the present disclosure is defined otherwise below, all technical and scientific terms used herein have the same meaning as commonly understood by one of ordinary skill in the art to which the present invention belongs.

The techniques and processes described in this disclosure are generally performed according to conventional methods, which are presented throughout this application. In general, nomenclatures and experimental procedures in molecular biology, biochemistry, analytical chemistry, and cell culture used in this disclosure are well known in the art and are the same as those commonly used.

Variants

The present disclosure provides an FGF7 polypeptide that is thermally stabilized by site-specific mutagenesis. In the present disclosure, a mutation is produced by site-specific mutagenesis after rationally predicting the most optimal amino acid at a new position that is not known previously through bioinformation analysis and protein design using a computer.

FIG. 1 shows the wild-type human FGF7 polypeptide sequence.

In the present disclosure, the term "wild-type" refers to native FGF7 having the most common amino acid sequence among members of the species. In the present disclosure, wild-type FGF7 is a human FGF7 that is a protein having a length of 194 amino acids (SEQ ID NO: 1, FIG. 1).

In the present disclosure, "fragment" refers to a functional fragment of an FGF7 polypeptide having FGF7 activity. In addition, it refers to a functional fragment of a FGF7 polypeptide having 85% or more sequence identity with the sequence of SEQ ID NO: 1. The fragment of the FGF7 polypeptide may also have at least one or more substitutions according to the invention. Sequence identity of at least 96%, 97%, 98%, 99%, or 100% is preferred. The fragment is intended as a polypeptide consisting only of a part of the intact polypeptide sequence and structure, and may include C-terminal or N-terminal deletion of the variant. The functional fragment may have a cell binding region and a heparin binding segment of the FGF7 protein of interest according to the present invention.

In the present disclosure, "sequence identity" means that the same amino acid residues are found in the FGF7 polypeptide according to the present invention as described above. When the specified contiguous segments of the amino acid sequence of the FGF7 polypeptide are aligned and compared with the specific amino acid sequence corresponding to the reference molecule, the wild-type human FGF7 polypeptide is used as a reference. The percentage (%) of sequence identity is calculated by measuring the number of positions in which the same amino acid residue exists in both sequences, dividing this by the total number of positions in the segment compared with the reference molecule, and multiplying this by 100 to calculate the percentage (%) of sequence identity. Sequence alignment methods are well known in the art. The reference sequence as used herein refers to the specifically corresponding wild-type human FGF7 protein. For example, in mammalian species such as mice, rats, rabbits, primates, pigs, dogs, cattle, horses, and humans, FGF7 is highly conserved and exhibits greater than 85% sequence identity across a wide range of species. It is desirable that the sequence identity is at least 96%, 97%, 98%, or 99% or more, or 100%. A person of ordinary skill in the art may appreciate that the remaining 15% or less of the amino acids in the full length of the FGF7 protein according to the present invention may be variable, for example, using other sources of FGF7 species or due to suitable non-FGF7 peptide sequences generally known in the art, or addition of a tag. The FGF7 protein according to an embodiment of the present invention having 85% or more identity to wild-type FGF7 is unlikely to contain similar proteins other than FGF7, since other members of the FGF family generally have very low sequence identity.

The present inventors have confirmed that $120^{th}$, $126^{th}$, and $178^{th}$ positions in the wild-type human FGF7 are respectively associated with the thermal stability of the FGF7 polypeptide.

Herein, changing to the most appropriate amino acid at the positions associated with the thermal stability requires an inventor's inventive step.

The present inventors have confirmed that thermal stability may be improved by substituting a 120th alanine (A) with cysteine (C) to be located close to a disulfide bond formed by a 133th cysteine (C) and a 137th cysteine (C).

In addition, a 126th lysine (K) is substituted with glutamic acid (E) or aspartic acid (D) to induce formation of a salt bridge with a 175th arginine (R), further improving thermal stability.

Furthermore, a 178th lysine (K) is substituted with glutamic acid (E) or aspartic acid (D) to induce formation of a salt bridge with the 175th arginine (R), further improving thermal stability.

In the present disclosure, various variants may be any one of the various variants disclosed in Table 1.

TABLE 1

| # | Variants | SEQ ID NO |
|---|---|---|
| 1 | (A120C) | SEQ ID NO: 6 |
| 2 | (K126E) | SEQ ID NO: 7 |
| 3 | (K126D) | SEQ ID NO: 8 |
| 4 | (K178E) | SEQ ID NO: 9 |
| 5 | (K178D) | SEQ ID NO: 10 |
| 6 | (A120C, K126E) | SEQ ID NO: 11 |
| 7 | (A120C, K126D) | SEQ ID NO: 12 |
| 8 | (A120C, K178E) | SEQ ID NO: 13 |
| 9 | (A120C, K178D) | SEQ ID NO: 14 |
| 10 | (K126E, K178E) | SEQ ID NO: 15 |
| 11 | (K126E, K178D) | SEQ ID NO: 16 |
| 12 | (K126D, K178E) | SEQ ID NO: 17 |
| 13 | (K126D, K178D) | SEQ ID NO: 18 |
| 14 | (A120C, K126E, K178E) | SEQ ID NO: 19 |
| 15 | (A120C, K126D, K178E) | SEQ ID NO: 20 |
| 16 | (A120C, K126E, K178D) | SEQ ID NO: 21 |
| 17 | (A120C, K126D, K178D) | SEQ ID NO: 22 |

Among the various variants above, a mutation at a single site may improve thermal stability, but the thermal stability may be more improved by two or more mutations. Furthermore, three mutations may more improve the thermal stability. In general, a coding gene of FGF7 is cloned and then expressed in a transformed organism, preferably in a microorganism. A host organism expresses a foreign gene to produce FGF7 under expression conditions. In addition, a synthetic recombinant FGF7 may be made in eukaryotes, for example, yeasts or human cells. The FGF7 may be in the form of 194 amino acids, 141 amino acids in which Nos. 2 to 54 are deleted, 164 amino acids in which the Nos. 1 to 30 are deleted, or a combination thereof according to a recombination production method. FIG. 2 illustrates a Δ53N-hFGF7 sequence (SEQ ID No:2) deleting $2^{nd}$ to $54^{th}$ amino acids from SEQ ID NO: 1 but including a pCold I site. Herein, the synthesized amino acid may be in the form of 141 amino acids in which the Nos. 2 to 54 are deleted or 142 amino acids in which methionine (M), the first sequence of the pCold I site, remains.

The description provided in the present application for the first time demonstrates that some changes in wild-type FGF7 construct FGF7 mutations with higher temperature stability and a longer half-life than the wild-type protein.

The FGF7 protein of the present invention used to insert the substitutions described herein, as long as it meets criteria specified herein, that is, is thermally stabilized while retaining desired biological activity of the wild-type FGF7, may be derived from any mammal such as mice, rats, rabbits, primates, pigs, dogs, cattle, horses, whales, humans, etc. Preferably, the FGF7 protein of interest is derived from a human source. However, regarding an amino acid sequence SEQ ID No: 1 of the human FGF7 protein, which is used as a comparative reference, all biological active variants for mammalian FGF7 having greater than or equal to 85% and most preferably greater than or equal to about 96%, greater than or equal to 97%, greater than or equal to 98%, or greater than or equal to 99% of sequence identity may be used in the present invention.

In some embodiments, the stable FGF7 polypeptides according to the present invention may further include a tag or a sequence which may be used to facilitate detection, purification, tagging to specific tissues or cells, improved stability, extended activity, improved expression, etc., in addition to any additional FGF peptide known in the art.

Pharmaceutical and Cosmetic Compositions

The various variants disclosed in Table 1 may be provided as pharmaceutical and/or cosmetic compositions together with a pharmaceutically or cosmetically acceptable carrier.

The various variants disclosed in Table 1 may be administered to a subject in need of promoting angiogenesis, wound healing, cartilage or bone formation, or neurogenesis, or a subject in need of improving skin conditions such as wrinkle improvement, skin elasticity improvement, skin aging prevention, hair loss prevention or hair growth promotion, skin moisture improvement, age spot removal, or acne treatment. In addition, after radiotherapy, it may be administered to a subject as a treatment for stomatitis, a treatment for head and neck cancer, a treatment for graft-versus-host disease, and the like. The various variants disclosed in Table 1 may be administered in the "native" form, or, if desired, in the form of salts, esters, amides, prodrugs, derivatives, and the like, but the salts, esters, amides, prodrugs, or derivatives may be selected from substances that are pharmacologically compatible, that is, effective for the method(s). Salts, esters, amides, prodrugs, and other derivatives of peptides are known to those skilled in the art of synthetic organic chemistry, and may be prepared using, for example, standard known procedures.

The various variants disclosed in Table 1 may be formulated into transdermally-administered products, for example, aerosols, creams, serums, and patches for subcutaneous, parenteral, topical, oral, nasal (or otherwise inhaled), rectal, or topical administration. The composition may be administered in various unit dosage forms depending on the method of administration. Suitable unit dosage forms may include, but are not limited to, powders, tablets, pills, capsules, lozenges, suppositories, patches, nasal sprays, injections, implantable sustained release formulations, lipid complexes, and the like.

When the various variants disclosed in Table 1 are combined with a cosmetically acceptable carrier to form a cosmetic composition, fillers (e.g., hyaluron fillers, poly (methyl methacrylate) (PMMA) microspheres, and collagen fillers), etc. may be additionally included. The composition may preferably be for topical, subcutaneous, or transdermal administration.

The composition may be an injectable composition.

The composition may further include collagen (e.g., bovine, porcine, or human collagen) or hyaluronic acid. The collagen may be synthetic collagen, and the hyaluronic acid may be chicken meal or a fermentation product of a microorganism.

The composition may further include an anesthetic (e.g., lidocaine).

The composition may be a skin cream (e.g., a face cream, a neck cream, or a body cream).

The composition may be a liquid formulation in the form of a serum or toner.

The composition may be a semi-solid preparation in a gel state.

The pharmaceutically acceptable carrier includes those listed in other generally-recognized pharmacopeias which are approved by a federal or state regulatory agency or used in U.S. pharmacopeia or in animals, particularly, in humans or animals, and more particularly, in humans. The "carrier" means, for example, a diluent, adjuvant, excipient, auxiliary agent, or vehicle which is administered with one or more peptides described herein.

The pharmaceutically acceptable carrier may contain, for example, at least one physiologically acceptable compound that acts to stabilize the composition or increase or decrease absorption of the various variants disclosed in Table 1. The physiologically acceptable compound may include, for example, carbohydrates such as glucose, sucrose, lactose, maltose, trehalose, mannitol, levan, or dextran, antioxidants such as ascorbic acid or glutathione, chelating agents, low molecular weight proteins, protective and absorption enhancers such as lipids, compounds that reduce the clearance or hydrolysis of the peptide, or other excipients, stabilizers, and/or pH adjusting buffers.

Other physiologically acceptable compounds, particularly those used in the manufacture of tablets, capsules, gel caps, and the like, may include, but are not limited to, binders, diluents/fillers, disintegrants, lubricants, and suspending agents.

In order to prepare oral dosage forms (for example, tablets), excipients, any disintegrant, binders, lubricants, and the like may be added to the various variants disclosed in Table 1, and a composition obtained therefrom may be compressed. If necessary, the compressed product may be coated in known methods for taste masking or dissolution or sustained release in the intestine.

Other physiologically acceptable compounds capable of being formulated with the various variants disclosed in Table 1 may include wetting agents, emulsifying agents, dispersing agents, or preservatives which are particularly useful for preventing growth or action of microorganisms. The excipients may be used in a sterile and contaminant-free state.

The various variants disclosed in Table 1 may be incorporated into formulations for cosmetic use and topically applied, and may be, for example, formulated as skin creams (for example, face creams, neck creams, or body creams) or body lotions, wrinkle-removing creams, moisturizing creams, eye creams, or whitening creams, or incorporated into cosmetics, sunscreens, or moisturizers.

In addition, the various variants disclosed in Table 1 may be incorporated into formulations optionally further including fillers, moisturizers, vitamins (for example, vitamin E or vitamin C), and/or colorants/dyes.

Suitable injectable cosmetic formulations may unlimitedly include at least one filler material in addition to the various variants disclosed in Table 1, but are not limited thereto. Examples of injectable cosmetic wrinkle fillers may include temporary (absorbable) fillers such as collagen (for example, synthetic collagen, bovine collagen, porcine collagen, human collagen, etc.), hyaluronic acid gel, calcium hydride (typically implanted in the form of a gel), or poly-L-lactic acid (PLLA), etc., but are not limited thereto. The peptides also may be incorporated into injectable cosmetic formulations containing permanent (non-absorbable) fillers. Examples of the "permanent" fillers may include poly(methyl methacrylate) beads (PMMA microspheres), but are not limited thereto.

The various variants disclosed in Table 1 may be incorporated into or administered with a dermal filler, an injectable formulation, etc. Such an injectable formulation may further include an anesthetic (e.g., lidocaine or an analog thereof). The injectable formulation is substantially sterilized or sterilized and/or conforms to institutional guidelines for subcutaneous injectable fillers.

The various variants disclosed in Table 1 may be administered to a subject by using any route known in the art, wherein the route may be (for example, intravenous, intraperitoneal, subcutaneous, intramuscular, intradermal, or intradermal) injection, inhalation, transdermal application, rectal administration, Desirable administration routes vaginal administration, or oral administration, include subcutaneous, transdermal, or topical application.

Effective amounts of the various variants disclosed in Table 1 may be administered via topical (i.e., non-systemic) administration, for example, peripheral intramuscular, intravascular, and subcutaneous administration, but are not limited thereto.

Administration of the various variants disclosed in Table 1 may be in any convenient manner, for example, by injection, intravenous and arterial stents (including eluting stents), catheter, oral administration, inhalation, transdermal application, rectal administration, and the like.

The various variants disclosed in Table 1 may be formulated with a pharmaceutically acceptable carrier prior to administration, e.g., as described above. The pharmaceutically acceptable carrier may not only be determined by a specific composition to be administered, but may also be partially determined in a specific method for administering the composition.

A dosage administered in a subject, in the context of the methods described in the application, should be sufficient enough to affect a beneficial therapeutic response (for example, increased subcutaneous adipogenesis) in the subject over time. The dosage will be determined by efficacy of an employed specific vehicle/delivery method, administration sites, administration routes, and conditions of the subject, and in addition, a body weight or surface area of the subject to be treated. A size of the dosage will also be determined by presence of any adverse side effects that accompany the administration of a specific peptide in a specific subject, sex, and an extent thereof.

The various variants disclosed in Table 1 may be administered systemically (e.g., orally or as an injection) according to standard methods that are well known to those skilled in the art. The peptides may be administered to the oral cavity in various forms such as lozenges, aerosol sprays, mouthwashes, coated swabs, and the like. A variety of oral and sublingual formulations also may be considered. The various variants disclosed in Table 1 may be administered as a depot formulation, when formulated as an injection for providing treatment over a period of time.

The various variants disclosed in Table 1 may be administered topically, for example, to the skin surface, local lesions or wounds, surgical sites, or the like.

The various variants disclosed in Table 1 may be delivered through the skin by using a conventional transdermal drug delivery system, i.e., a transdermal "patch", and contained in a layered structure typically serving as a drug delivery device attached to the skin.

Other formulations for topical delivery include ointments, gels, sprays, fluids, and creams, but are not limited thereto. The ointments may be simi-solid preparations, typically based on petrolatum or other petroleum derivatives. Like any other carrier or vehicle, an ointment base should be inert, stable, non-irritating, and non-sensitizing. The creams containing ones selected from the various variants disclosed in Table 1 may be typically viscous liquids, semi-solid emulsions, or often oil-in-water or water-in-oil. Cream bases are typically water washable and contain an oil phase, an emulsifier, and an aqueous phase. Specific ointment or cream bases to be used are provided for optimal drug delivery, as appreciated by those skilled in the art.

The various variants disclosed in Table 1 may be provided as a "concentrate" in a storage container ready for dilution (for example, in a pre-measured volume) or in a soluble capsule ready for adding a large amount of water, alcohol, hydrogen peroxide, or other diluents. For example, the peptide can be lyophilized for later reconstitution.

The various variants disclosed in Table 1 may have various uses. The various variants disclosed in Table 1 may have uses in many applications. For example, since subcutaneous fat provides fullness and firmness to the skin, enhancing formation of the subcutaneous fat is used in plastic surgery procedures. Aging skin contains less subcutaneous fat. Accordingly, one or more of the various variants disclosed in Table 1 according to the present disclosure may be administered to desired sites to promote the formation of the subcutaneous fat and thus accomplish fuller younger-looking skin. This approach may replace current methods of transplanting fat cells from other parts (for example, thighs or buttocks) of the body, which often suffer a low success rate.

The various variants disclosed in Table 1 may be administered, if desired, to enhance subcutaneous adipose tissues (for example, to enhance subcutaneous adipose tissues without substantially increasing visceral fat and/or other adipose tissues). In response to the administration of the various variants disclosed in Table 1, fat cells may be formed in dermal fibroblasts, and a volume thereof may be added in selected subcutaneous sites of the subject.

The various variants disclosed in Table 1 may be used to reduce scarring. This can be achieved by administering one or more of the various variants disclosed in Table 1 in a sufficient amount to reduce scarring and/or to improve appearances around scarring. The scarring may be, for example, scars produced by a burn, surgery, acne, a biopsy, or an injury.

The various variants disclosed in Table 1 may be used in various cosmetic procedures, for example, to improve the appearance of the skin. This may be accomplished by administering one or more peptides to the site of the subject in an amount sufficient to improve the appearance of the skin. Such administration may include subcutaneous administration to regions such as lips, eyelids, cheeks, forehead, chin, neck, and the like. The peptides are used in the methods of reducing wrinkles, lifting sagging skin, improving the surface texture of the skin, removing or filling the wrinkles, removing or reducing aged spots, and/or removing dark circles under eyes. These cosmetic applications are just examples and are not intended to be limiting.

The various variants disclosed in Table 1 may be used to improve a tissue volume at the site of a subject. This may be accomplished by administering one or more of the peptides described herein to the site of the subject in an amount sufficient to increase tissue volume. For example, the increase in the tissue volume may include firming or augmenting breast tissues and/or firming or augmenting hip tissues or other parts of the body or face.

The FGF7 used at this time may be used in an amount of about 0.01 to about 10 ppm. When the FGF7 is used in an amount of greater than or equal to about 10 ppm, side effects to induce adverse reactions may occur due to the excessive amount. Accordingly, the FGF7 may be used within a practical use range of about 0.01 ppm to about 10 ppm, and preferably, about 0.01 ppm to about 2 ppm.

The various variants disclosed in Table 1 may also be used to soften the skin in the site of a subject. This may be accomplished by administering one or more of the peptides described herein to the desired site in an amount sufficient to soften the skin. The softening the skin may include smoothing scars caused by acne, smoothing out a cellulite region, smoothing or reducing stretch marks, and/or smoothing out wrinkles.

The various variants disclosed in Table 1 may be used to recruit stem cells to the formation of subcutaneous fat in a subject. This may be accomplished by administering the various variants disclosed in Table 1 in an amount sufficient to recruit stem cells for forming subcutaneous fat. This has utility, for example, in various reconstructive surgical procedures and the like.

The various variants disclosed in Table 1 may be used to reconstruct tissue in a subject. Such reconstruction may include, for example, breast reconstruction (e.g., after surgery to remove a tumor), or face or limb reconstruction (e.g., after an automobile accident or burn). This may be achieved by administering the various variants disclosed in Table 1 in an amount of increasing the tissue volume either during or after the tissue reconstruction process. The various variants disclosed in Table 1 may optionally be used in combination with tissue graft materials or other procedures that enhance healing of the skin or injured tissues.

The various variants disclosed in Table 1 may be used to reduce heel pain experienced by a subject when walking by administering it in a sufficient amount.

The various variants disclosed in Table 1 may be administered for augmentation of subcutaneous fat to increase thermoregulation and/or improve the immune function. The subject may be treated with the various variants disclosed in Table 1 to prevent disease or treat ongoing diseases associated with increased organ fat unlimitedly including cardiovascular disease, and other obesity associated diseases.

Administration in any of these methods may be topical or systemic, and may be by any route described herein, such as topical, subcutaneous, transdermal, oral, nasal, vaginal, and/or rectal administration. Preferably, the various variants disclosed in Table 1 may be administered by subcutaneous injection. Alternatively, the various variants disclosed in Table 1 may be administered topically in the form of a skin cream such as a face cream, or may be administered transdermally through a transdermal patch.

Although the above uses and methods are described with reference to use in humans, they are also suitable for use in animals, e.g., for veterinary use. Accordingly, certain preferred organisms include, but are not limited to, humans, non-human primates, canines, horses, cats, pigs, ungulates, rabbits, and the like.

Medium

The various variants disclosed in Table 1 are included in a 'medially effective amount' corresponding to the amount necessary to maintain the pluripotent stem cells in an undifferentiated state for at least 5 passages to provide a human pluripotent stem cell medium.

In the present disclosure, the term 'human pluripotent stem cells', which includes both human embryonic stem cells and induced pluripotent stem cells, refers to an ability to form a pluripotency that allows it to generate the same progeny and virtually all cell types in the human body self-renewal capacity.

In the present disclosure, the term "maintaining stem cells in a pluripotent state" means maintaining the cells in an undifferentiated state having an ability to differentiate into virtually any cell type. This pluripotent state depends on a stemness-supporting cocktail of growth factors, of which FGF7 is the most important growth factor. FGF7 supports self-renewal in several ways: directly activating the mitogen-activated protein kinase pathway and indirectly catalyzing transforming growth factor $\beta 1$ and activin signaling (Greber, et al. 2008, Stem Cells 25, 455-464). FGF7 contributes in multiple ways to the pluripotency of human PSCs through cell adhesion and survival functions.

The present disclosure provides a method for characterizing an engineered subject FGF7, demonstrating a substitution effect in a protein, a method of using the protein in culturing human PSCs, and a medium including one or more thermostable FGF7 proteins described herein suitable for culturing human PSCs in an undifferentiated state. Human embryonic stem cells (ESCs) used in the examples provided herein were derived from blastocyst embryos obtained with the informed consent of a physician. A well-characterized human ESC cell line (Adewumi, et al. 2007, Nat Biotechnol 25, 803-816) CCTL14 (Center of Cell Therapy Line) at passages 29-41 was used. As in human induced pluripotent stem cells (iPSCs), the AM13 cell line, derived using reprogramming of dermal fibroblasts by Yamanaka's cocktail and Sendai virus transfection, was used as passage 34-41 (Kruta et al. 2014, Stem Cells and Development 23, 2443-2454).

Hereinafter, preferred experimental examples are presented to aid the understanding of the present invention, but the following experimental examples are only illustrative of the present invention, and the scope of the present invention is not limited to the following examples.

pCold I Construction and Purification of Variants using the Vector

A variant at one position (A120C), a variant at two positions (A120C, K126E), a variant at two positions (A120C, K178E), a variant at three positions (A120C, K126E, K178E) of FGF7 were synthesized and subcloned into a pCold I vector having His-Tag. The recombinant vector into which FGF7 was inserted was transformed into BL21 (DE3) cells and expressed.

10 ml LB media (Ambrothia) (0.25 g used) was inoculated, and 10 ul of ampicillin (50 mg/ml) was added and then pre-cultured at 37° C.

10 ml of the pre-culture solution and 1 ml of ampicillin (50 mg/ml) were inoculated into 1 L LB media (Ambrothia) (25 g used) and cultured at 37° C. When the value of $OD_{600}$ was 0.6, the culture medium was cooled in a refrigerator at 4° C. for 10 minutes, and then 5 mM of beta-di-1-thiogalactopyranoside (β-D-1-thiogalactopyranoside; IPTG) was added to obtain E. coli cells induced for expression at 17° C. for 24 hours.

After centrifugation, the optimally dissolved supernatant was injected into a column with Ni-NTA beads. The supernatant injected into the column was washed with a first wash buffer solution (20 mM Tris pH 8.0, 200 mM NaCl) and a second wash buffer solution (20 mM Tris pH 8.0, 200 mM NaCl, 30 mM imidazole), which were three times the volume of the pCold I_FGF7 protein, and eluted by using 100 ml of an elution buffer solution (20 mM Tris pH 8.0, 200 mM NaCl, 1 M imidazole), while sequentially increasing a concentration of the imidazole, to perform primary purification.

The supernatant purified through the primary affinity chromatography (Ni-NTA) experiment was secondly injected into a column with heparin beads. Subsequently, the supernatant was washed with the first wash buffer solution (20 mM Tris 8.0, 200 mM NaCl), which was three times the volume of the pCold I_hFGF7 protein, and eluted with 60 ml of an elution solution (20 mM Tris pH 8.0, 1500 mM NaCl) to perform secondary purification.

Finally, the pCold I_hFGF7 protein fraction was purified by gel filtration using a HiLoad™ 16/60 Superdex 75 (Amersham Biosciences) column and 1X PBS buffer (137 mM NaCl, 2.7 mM KCl, 10 mM $Na_2HPO_4$, 2 mM $KH_2PO_4$, pH 7.4), (WELGENE).

Spectral Analysis of Variants

Recombinant FGF7 proteins were measured with respect to spectrum data. Referring to FIG. 3, base peak chromatograms of reduced condition and non-reduced condition samples show that peptides (14.4, 26.3, and 32.63 min) were associated with disulfide bonds.

Figure 4:
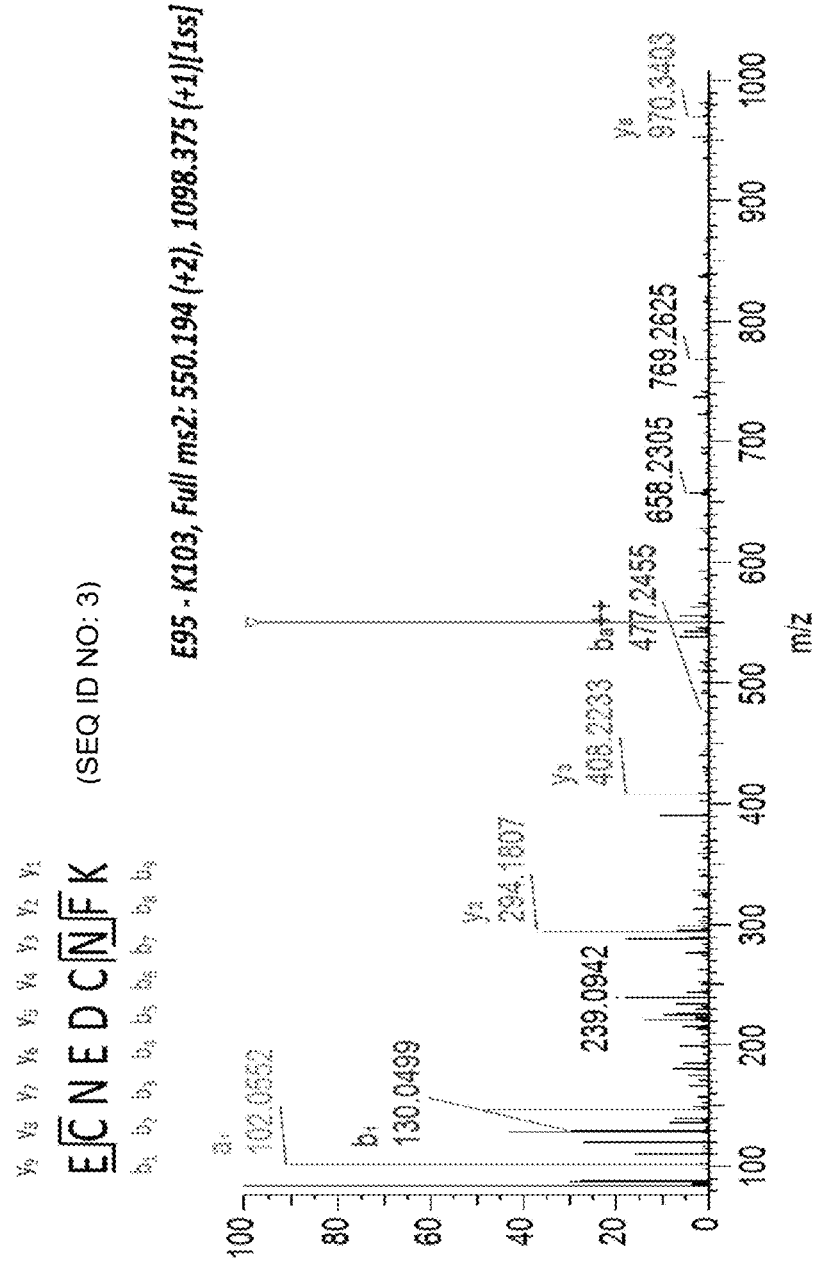
FIG. 4 shows a detailed fragment spectrum of a disulfide-bonded peptide (ECNEDCNFK(SEQ ID NO: 3), 550.194 Da, +2 charge).

FIG. 4 shows a detailed fragment spectrum of disulfide-bonded peptide (ECNEDCNFK (SEQ ID NO: 3), 550.194 Da, +2 charge). The spectrum shows characteristic b/y ions due to backbone cleavage of peptides associated by the disulfide bonds (ECNEDCNFK (SEQ ID NO: 3), 550.194/1098.375 Da, +2/+1 charge). The disulfide-bonded peptide exhibits theoretical mass (1098.375 Da, +1 charge) which completely agrees with experimental mass (1098.373 Da, +1 charge, −1.89 ppm).

Salt Bridge Structure Analysis of Variants

Figure 5:
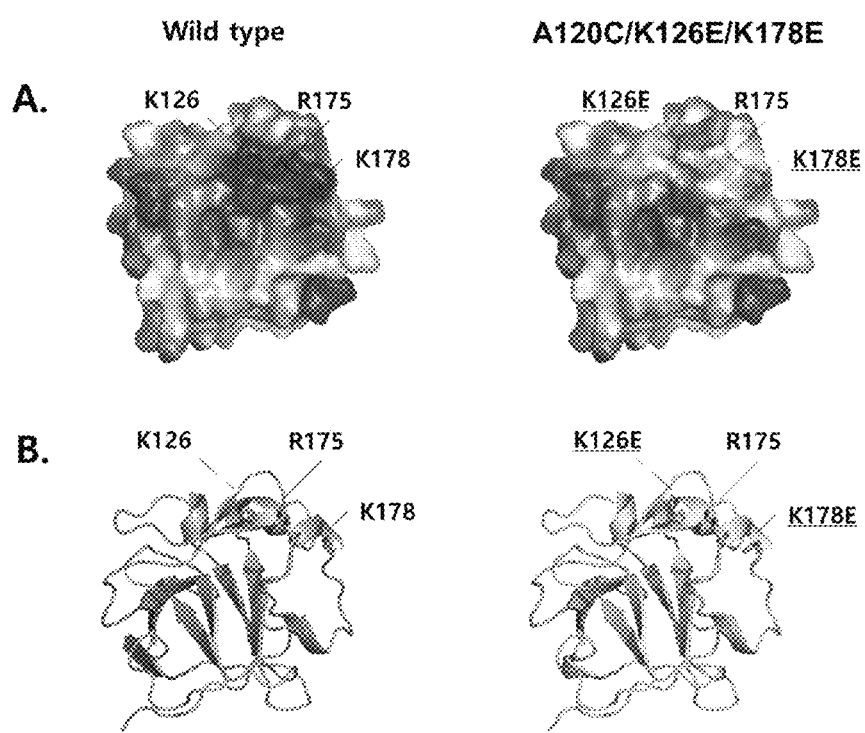
FIGS. 5A and 5B show the 3D structures and ribbon structures of wild type and variant FGF7.
Figure 6:
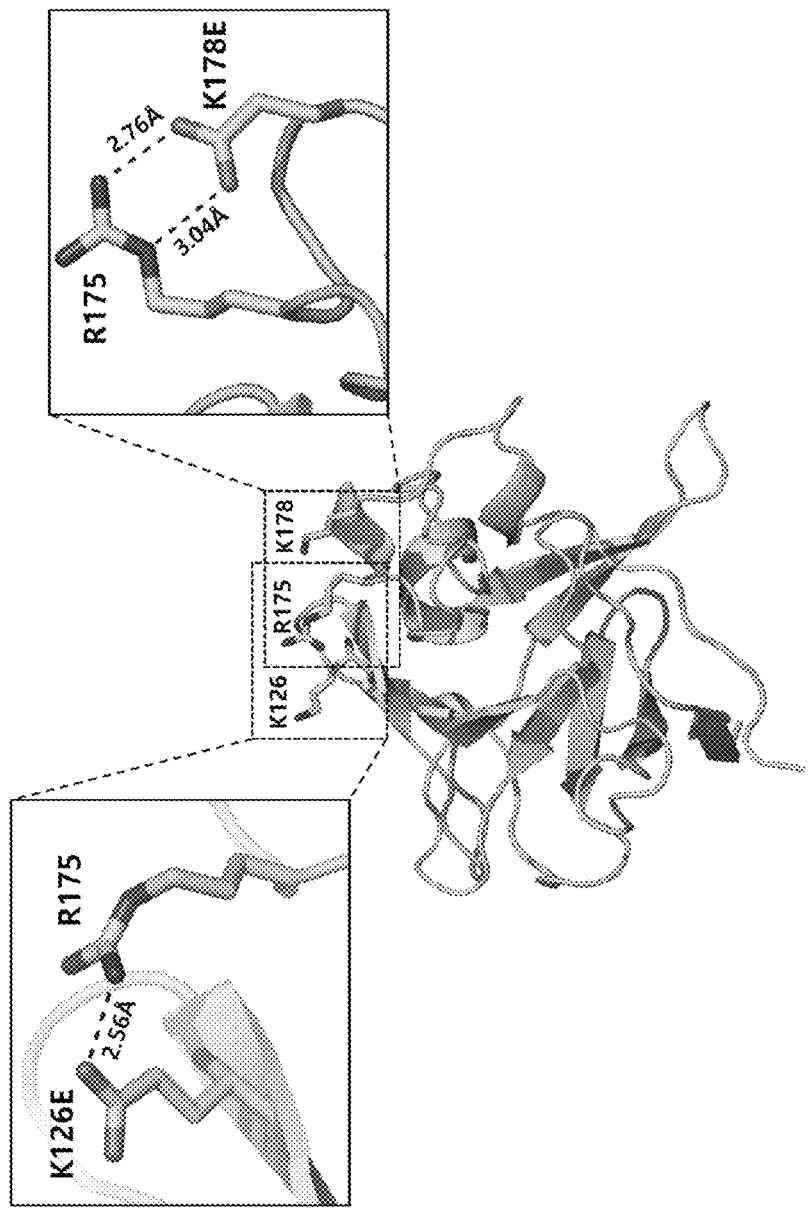
FIG. 6 shows the results of measuring the distance between R175 and K126E and the distance between R175 and K178E in the ribbon structure of the FGF7 variant using a Swiss model server.

As shown in FIGS. 5 and 6, as a result of analysis based on the 3D structure, the 175th arginine (R) moiety (R175) was located in the middle of the 126th moiety and the 178th moiety, and a distance between the amino acids was close enough to form a salt bridge. As a result of prediction using the Swiss model server, when the $126^{th}$ lysine (K) was substituted with glutamic acid (E) (K126E), anionic OE2 of K126E and NH2 of R175 maintained a distance of 2.56 Å therebetween. Even when the 178th lysine (K) was substituted with glutamic acid (E) (K178E), OE1 of K178E and NH1 of R175 maintained a distance of 2.76 Å. These analyses imply that positively-charged guanidinium of R175 may interact with K125E and a negatively-charged carboxyl group of K178E to form a salt bridge, a combination of two non-covalent interactions of a hydrogen bond, and an ion bond.

Thermodynamic Stability Analysis of Variants

Figure 7:
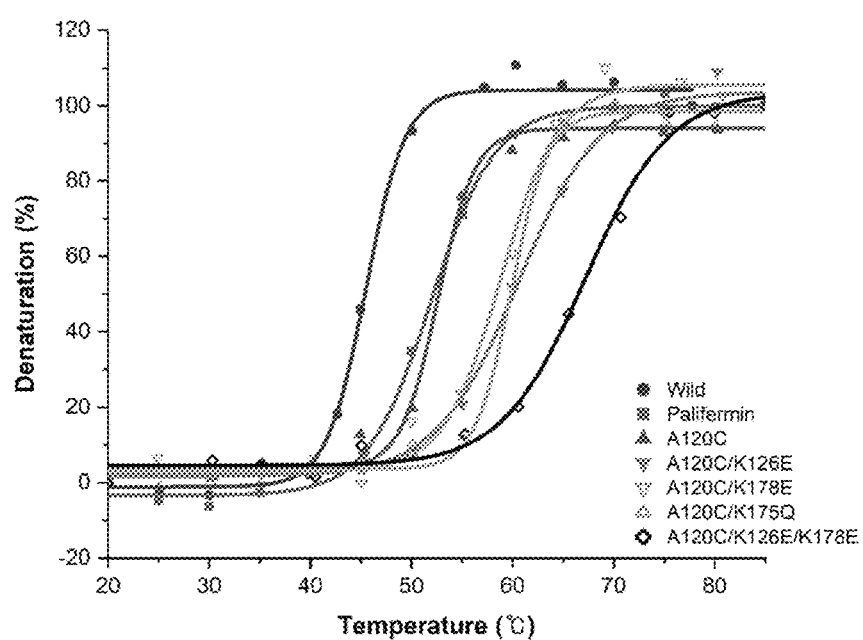
FIG. 7 shows a thermal denaturation curve measured by circular dichroism.

In order to compare thermodynamic stability of Δ53_hFGF7 (palifermin) and FGF7 variants, FGF7 variants were monitored with respect to thermal conformational changes by using CD spectroscopy at 190 nm. The results are shown in FIG. 7. A midpoint transition temperature (Tm) was analyzed by using a thermal denaturation curve. Tm of Δ53_hFGF7 (palifermin) was 51.9° C., which was 6.4° C. higher than 45.5° C. of wild-type FGF7. On the other hand, Tm of FGF7 variants (A120C, A120C/K126E, A120C/K178E, A120C/K126E/K178E) was respectively 52.6° C., 60.4° C., 58.8° C., and 67.1° C. When the FGF7 variants were compared with conventional Δ53_hFGF7 (palifermin), Tm respectively increased by 0.67° C., 8.53° C., 6.89° C., and 15.24° C. In particular, double mutations of K126E/K178E exhibited higher Tm than a single mutation of K126E or K178E.

37° C. Stability Experiment

The purified FGF7 proteins reacted at a concentration of 0.5 mg/ml for 0, 4, 8, 12, and 15 days at 37° C. by using a 1X PBS buffer as a base and dyed with a Komash blue staining reagent to conduct 15% SDS-PAGE electrophoresis. Densities of protein bands remaining on SDS-PAGE GEL were quantitatively measured by using an ImageJ program (Wayne Rasband, NIH).

Figure 8:
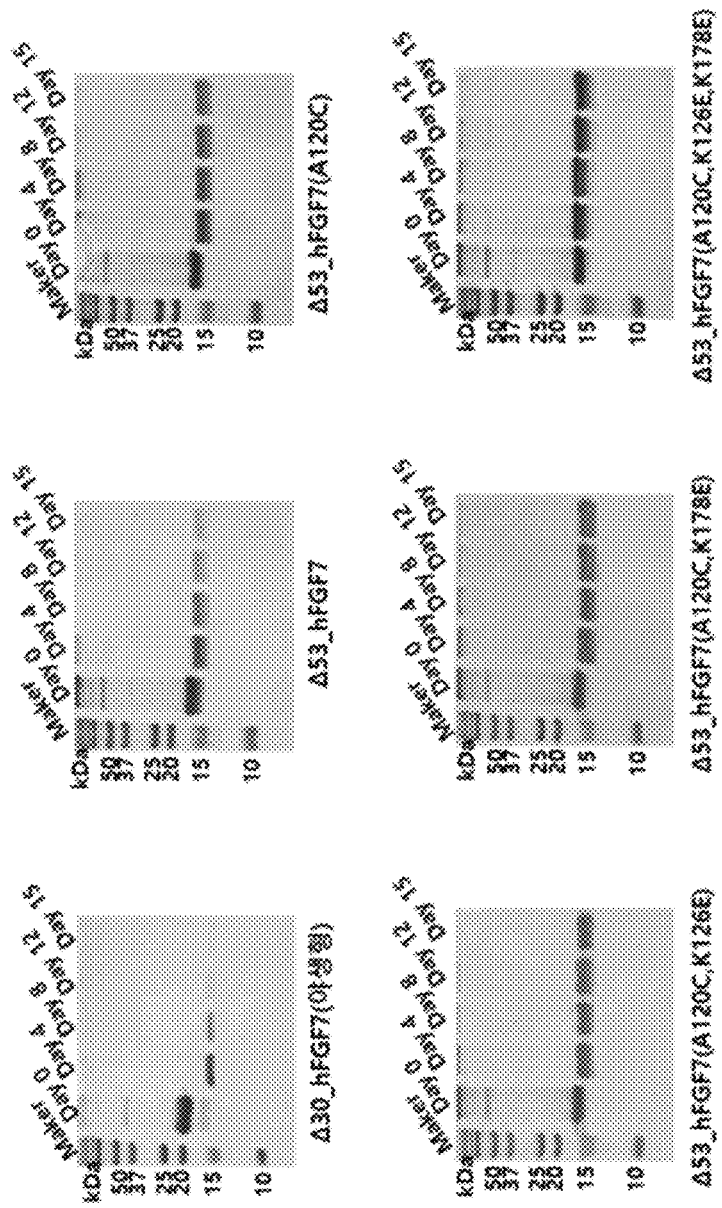
FIG. 8 shows SDS-PAGE to measure the stability at 37° C. of the wild-type FGF7 (Δ30N_hFGF7)(SEQ ID NO: 23), and Δ53N_hFGF7 (palifermin) (SEQ ID NO: 24) and FGF7 variants (Δ53N_hFGF7 (A120C)((SEQ ID NO: 25), Δ53N_hFGF7 (A120C, K126E) (SEQ ID NO: 26), Δ53N_hFGF7 (A120C, K178E) (SEQ ID NO: 27), and Δ53N_hFGF7 (A120C, K126E, and K178E) (SEQ ID NO: 28)).

As illustrated in FIG. 8, thermal stabilities of the variants were improved from FGF7 polypeptide bands identified through 15% SDS-PAGE.

The density was measured by using the ImageJ program (Wanyne Rasband) to measure density of SDS-PAGE GEL. The results are shown in Table 2, which is provided as a graph in FIG. 9.

TABLE 2

|  | 0 days | 4 days | 8 days | 12 days | 15 days |
| --- | --- | --- | --- | --- | --- |
| Δ30_hFGF7(wild type) (SEQ ID NO: 23) | 100 | 40 | 14 | 4 | 4 |
| Δ53_hFGF7(palifermin) (SEQ ID NO: 24) | 100 | 60 | 46 | 23 | 18 |
| Δ53_hFGF7 (A120C) (SEQ ID NO: 25) | 100 | 87 | 77 | 73 | 66 |
| Δ53_hFGF7 (A120C, K126E) (SEQ ID NO: 26) | 100 | 97 | 89 | 103 | 96 |
| Δ53_hFGF7 (A120C, K178E) (SEQ ID NO: 27) | 100 | 107 | 94 | 107 | 100 |
| Δ53_hFGF7 (A120C, K126E, K178E) (SEQ ID NO: 28) | 100 | 116 | 120 | 112 | 118 |

Unit: %

Figure 9:
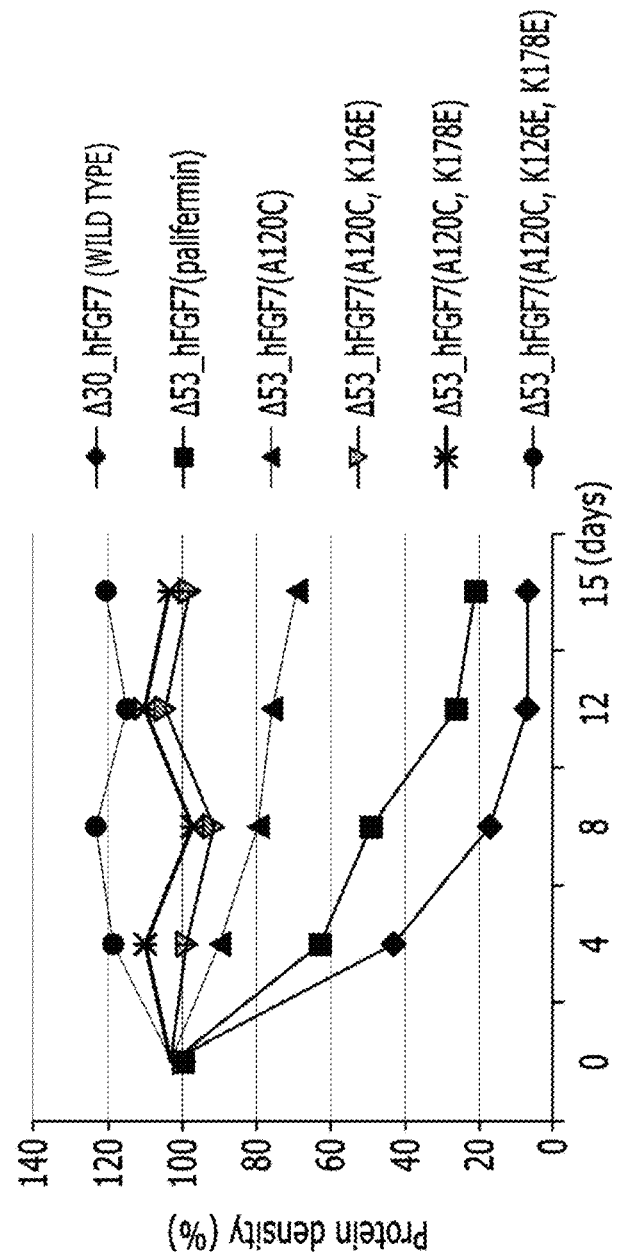
FIG. 9 is a graph showing the results of measuring the density of protein bands remaining on SDS-PAGE over time of the wild-type FGF7 (Δ30N_hFGF7) (SEQ ID NO: 23), and Δ53N_hFGF7 (palifermin) (SEQ ID NO: 24) and FGF7 variants (Δ53N_hFGF7 (A120C) (SEQ ID NO: 25), Δ53N_hFGF7 (A120C, K126E) (SEQ ID NO: 26), Δ53N_hFGF7 (A120C, K178E) (SEQ ID NO: 27), and Δ53N_hFGF7 (A120C, K126E, and K178E) (SEQ ID NO: 28)).

Referring to the results of Table 2 and FIG. 9, Δ53N_hFGF7 (palifermin) exhibited a reduced protein band to 18% at the $15^{th}$ day, whereas 66% of Δ53N_hFGF7 (A120C) remained at 15 days. Δ53N_hFGF7 (A120C, K126E) and Δ53N_hFGF7 (A120C, K178E) respectively exhibited that 96% and 100% of proteins remained at 15 days. Δ53N_hFGF7 (A120C, K126E, K178E), into which mutations at all three positions were introduced, exhibited 118% at the $15^{th}$ day, which is an error increased from 0 day, but stably maintained bands near 100% for 15 days.

As a result of comparing stability of Δ30N_hFGF7 (wild) and Δ53N_hFGF7 (palifermin) according to a length of an N-terminal, the Δ30N_hFGF7 (wild type) from which a signal peptide was removed and the Δ53N_hFGF7 (palifermin) with a shorter N-terminal respectively exhibited density of 4% and 18% at the $15^{th}$ day, wherein the Δ53N_hFGF7 (palifermin) with a shorter N-terminal turned out to be more stable at 37° C.

45° C. Stability Experiment

The purified FGF7 protein was reacted at a concentration of 0.5 mg/ml for 0, 1, 2, 3, 4, 5, 6, and 7 days by using an 1X PBS buffer as a base at 45° C. and dyed with a Komash blue stain reagent to conduct 15% SDS-PAGE electrophoresis. The results are shown in FIG. 10.

Figure 10:
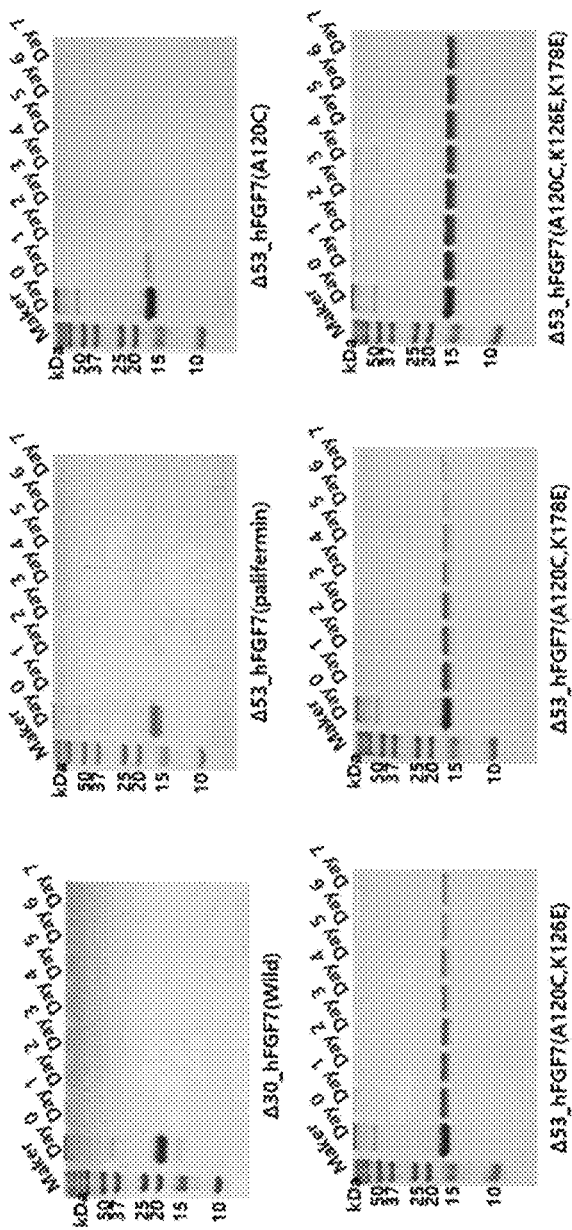
FIG. 10 shows SDS-PAGE for measuring stability at 45° C. of the wild-type FGF7 (Δ30N_hFGF7) (SEQ ID NO: 23), and Δ53N_hFGF7 (palifermin) (SEQ ID NO: 24) and FGF7 variants (Δ53N_hFGF7 (A120C) (SEQ ID NO: 25), Δ53N_hFGF7 (A120C, K126E) (SEQ ID NO: 26), Δ53N_hFGF7 (A120C, K178E) (SEQ ID NO: 27), and Δ53N_hFGF7 (A120C, K126E, and K178E) (SEQ ID NO: 28)).

As illustrated in FIG. 10, referring to the FGF7 polypeptide bands through 15% SDS-PAGE, thermal stability of the variants was improved.

Density of SDS-PAGE gels was measured by using the ImageJ program (Wayne Rasband). The results are shown in Table 3 and FIG. 11.

TABLE 3

| | 0 days | 1 day | 2 days | 3 days | 4 days | 5 days | 6 days | 7 days |
|---|---|---|---|---|---|---|---|---|
| Δ30_hFGF7 (wild type) (SEQ ID NO: 23) | 100 | 0 | 0 | 0 | 0 | 0 | 0 | 0 |
| Δ53_hFGF7 (palifermin) (SEQ ID NO: 24) | 100 | 0 | 0 | 0 | 0 | 0 | 0 | 0 |
| Δ53_hFGF7 (A120C) (SEQ ID NO: 25) | 100 | 16 | 6 | 0 | 0 | 0 | 0 | 0 |
| Δ53_hFGF7 (A120C, K126E) (SEQ ID NO: 26) | 100 | 57 | 51 | 42 | 30 | 29 | 19 | 22 |
| Δ53_hFGF7 (A120C, K178E) (SEQ ID NO: 27) | 100 | 66 | 51 | 43 | 22 | 21 | 10 | 9 |
| Δ53_hFGF7 (A120C, K126E, K178E) (SEQ ID NO: 28) | 100 | 84 | 86 | 81 | 74 | 80 | 76 | 79 | unit: %

Figure 11:
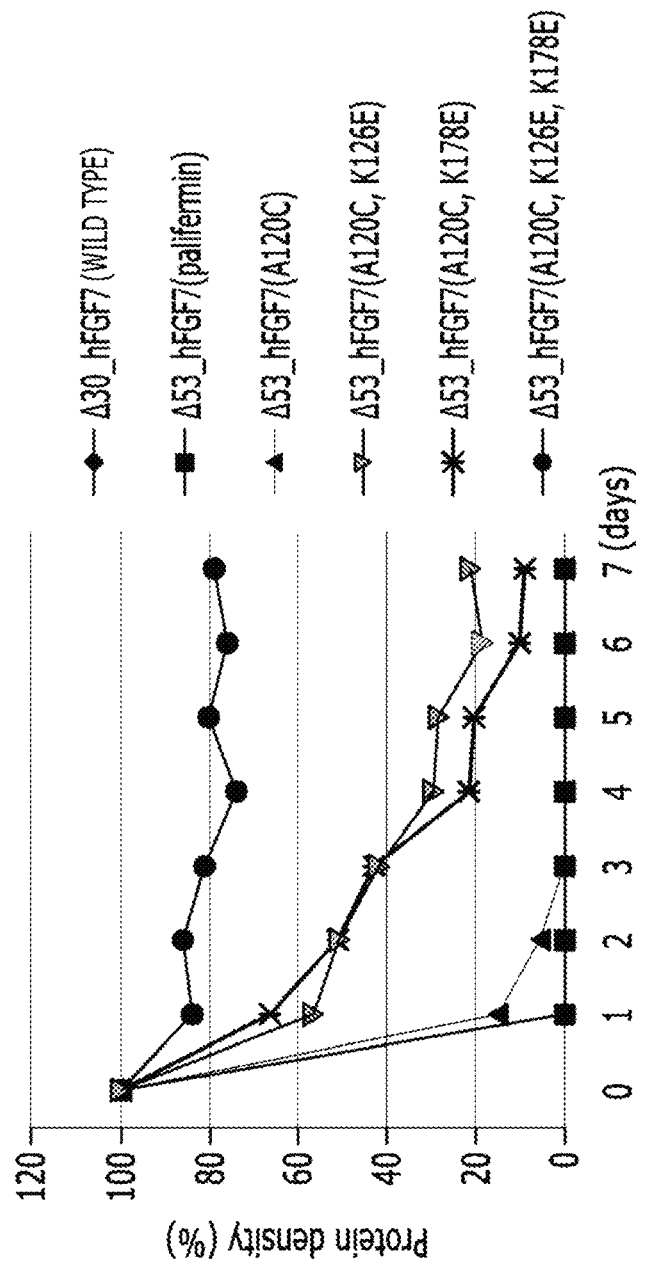
FIG. 11 is a graph showing the results of measuring the density of protein bands remaining on SDS-PAGE over time for measuring the stability at 45° C. of the wild-type FGF7 (Δ30N_hFGF7) (SEQ ID NO: 23), and Δ53N_hFGF7 (palifermin) (SEQ ID NO: 24) and FGF7 variants (Δ53N_hFGF7 (A120C) (SEQ ID NO: 25), Δ53N_hFGF7 (A120C, K126E) (SEQ ID NO: 26), Δ53N_hFGF7 (A120C, K178E) (SEQ ID NO: 27), and Δ53N_hFGF7 (A120C, K126E, and K178E) (SEQ ID NO: 28)).

Referring to the results of Table 3 and FIG. 11, all the variants exhibited improved thermal stability compared to wild-type hFGF7.

*Δ53N_hFGF7 exhibited a protein band of 0% after one day, whereas Δ53N_hFGF7 (A120C) exhibited a protein band of 0% after 3 days. Δ53N_hFGF7 (A120C, K126E) and Δ53N_hFGF7 (A120C, K178E) exhibited that each protein remained at 22% and 9% at the $7^{th}$ day. Δ53N_hFGF7 (A120C, K126E, K178E), into which all of the previously identified mutations were introduced, exhibited a protein band of 79% at the $7^{th}$ day.

In addition, there was no significant difference according to the length of the N-terminal at 45° C. as shown in Δ30_hFGF7 (wild type) and Δ53_hFGF7 (palifermin).

Experimental Example 3: Verification of Cell Proliferation Ability of Variants

HaCaT cells were used as variants and cultured and maintained in a DMEM medium containing 10% fetal bovine serum. In order to check cell proliferation activity by FGF7, cells was treated by using a serum-free DMEM medium containing 0.03% BSA.

The cells were cultured in 96 well plates at $0.6×10^4$/well, and treated with FGF7 (300 ng/ml) together with heparin (10 ug/ml) for 40 hours. Cell number increase was confirmed by measuring the production level of WST-8 formazan formed by an electron mediator and intracellular dehydrogenases, using WST-8 [2-(2-methoxy-4-nitrophenyl)-3-(4-nitrophenyl)-5-(2,4-disulfophenyl)-2H-tetrazolium, monosodium salt]. The degree of WST-8 formazan production can be confirmed through absorbance (450 nm). The experiment was repeated 4 times, and it was expressed as 'mean±standard deviation'.

FGF7 proteins were stored respectively for 0, 0.5, 1, 2, 4, 6, and 8 days at 45° C., and checked with respect to cell proliferation activity changes.

Figure 12:
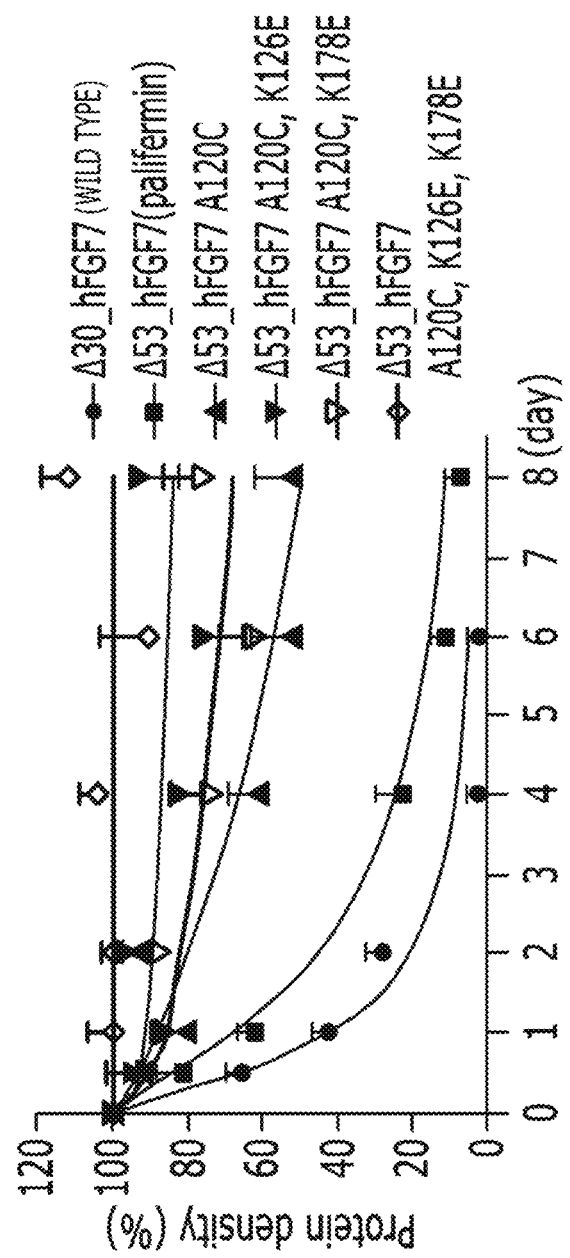
FIG. 12 is a graph measuring the change in cell proliferation activity at 45° C. of the wild-type FGF7 (Δ30N_hFGF7) (SEQ ID NO: 23), and Δ53N_hFGF7 (palifermin) (SEQ ID NO: 24) and FGF7 variants (Δ53N_hFGF7 (A120C) (SEQ ID NO: 25), Δ53N_hFGF7 (A120C, K126E) (SEQ ID NO: 26), Δ53N_hFGF7 (A120C, K178E) (SEQ ID NO: 27), and Δ53N_hFGF7 (A120C, K126E, and K178E) (SEQ ID NO: 28)).

The results are shown in Table 4 and FIG. 12.

TABLE 4

| | 50% Activity (ED50) |
|---|---|
| Δ30_hFGF7 (wild type) (SEQ ID NO: 23) | 0.8 days |
| Δ53_hFGF7 (palifermin) (SEQ ID NO: 24) | 1.7 days |
| Δ53_hFGF7 (A120C) (SEQ ID NO: 25) | 8.0 days |
| Δ53_hFGF7 (A120C, K126E) (SEQ ID NO: 26) | 1107 days |
| Δ53_hFGF7 (A120C, K178E) (SEQ ID NO: 27) | 33.9 days |
| Δ53 hFGF7 (A120C, K126E, K178E) (SEQ ID NO: 28) | |

Referring to Table 4 and FIG. 12, in the case of Δ30N_hFGF7 (wild type), as the time of storing the protein at 45° C. increases, the cell proliferation activity decreases, and the time point of showing 50% activity (ED50) was 0.8 days, whereas in the case of Δ53N_hFGF7 (palifermin), the ED50 was increased to 1.7 days. On the other hand, ED50 of Δ53N_hFGF7 (A120C) increased to 8 days, ED50 of Δ53N_hFGF7 (A120C, K178E) increased to 33.9 days, and ED50 of Δ53N_hFGF7 (A120C, K126E) increased to 1107 days. In addition, although Δ53N_hFGF7 (A120C, K126E, K178E) was stored for 8 days at 45° C., since cell proliferation activity was not reduced, the Δ53N_hFGF7 (A120C, K126E, K178E) exhibited the most increased thermal stability. Although the various example embodiments have been described above, the scope of the invention is not limited thereto. The embodiments may be implemented in various ways within the scope of the detailed description of the invention and the accompanying drawings, and this also belongs to the scope of the invention.

What is claimed is:

1. A thermally stable polypeptide having improved temperature stability compared to wild type human FGF7 polypeptide, wherein the polypeptide comprises the amino acid sequence of SEQ ID NO: 28.

2. The thermally stable polypeptide of claim 1, wherein each of the glutamic acid (E) residue at position 73 and glutamic acid (E) residue at position 125 forms a salt bridge with the arginine (R) residue at position 122, and the cysteine residue at position 80 and the cysteine residue at position 84 are disulfide bonded.

3. The thermally stable polypeptide of claim 1, wherein the glutamic acid (E) residue at position 73 and the glutamic acid (E) residue at position 125 are each substituted with aspartic acid (D).

4. A composition comprising:
the thermally stable polypeptide of claim 1; and
a pharmaceutically or cosmetically acceptable carrier.

* * * * *

SEQUENCE LISTING

```
Sequence total quantity: 28
SEQ ID NO: 1            moltype = AA  length = 194
FEATURE                 Location/Qualifiers
REGION                  1..194
                        note = FGF7
source                  1..194
                        mol_type = protein
                        organism = synthetic construct
SEQUENCE: 1
MHKWILTWIL PTLLYRSCFH IICLVGTISL ACNDMTPEQM ATNVNCSSPE RHTRSYDYME  60
GGDIRVRRLF CRTQWYLRID KRGKVKGTQE MKNNYNIMEI RTVAVGIVAI KGVESEFYLA 120
MNKEGKLYAK KECNEDCNFK ELILENHYNT YASAKWTHNG GEMFVALNQK GIPVRGKKTK 180
```

```
KEQKTAHFLP MAIT                                                             194

SEQ ID NO: 2            moltype = AA   length = 157
FEATURE                 Location/Qualifiers
REGION                  1..157
                        note = FGF7
source                  1..157
                        mol_type = protein
                        organism = synthetic construct
PEPTIDE                 1
                        note = 2nd to 54th amino acids are deleted from N-terminus
                         of SEQ ID NO:1 but including a pCold I site
SEQUENCE: 2
MNHKVHHHHH HIEGRHMSYD YMEGGDIRVR RLFCRTQWYL RIDKRGKVKG TQEMKNNYNI  60
MEIRTVAVGI VAIKGVESEF YLAMNKEGKL YAKKECNEDC NFKELILENH YNTYASAKWT 120
HNGGEMFVAL NQKGIPVRGK KTKKEQKTAH FLPMAIT                          157

SEQ ID NO: 3            moltype = AA   length = 9
FEATURE                 Location/Qualifiers
source                  1..9
                        mol_type = protein
                        organism = synthetic construct
SEQUENCE: 3
ECNEDCNFK                                                                     9

SEQ ID NO: 4            moltype = AA   length = 25
FEATURE                 Location/Qualifiers
source                  1..25
                        mol_type = protein
                        organism = synthetic construct
SEQUENCE: 4
KECNEDCNFK ELILENHYNT YASAK                                                  25

SEQ ID NO: 5            moltype = AA   length = 39
FEATURE                 Location/Qualifiers
source                  1..39
                        mol_type = protein
                        organism = synthetic construct
SEQUENCE: 5
ECNEDCNFKE LILENHYNTY ASAKWTHNGG EMFVALNQK                                   39

SEQ ID NO: 6            moltype = AA   length = 194
FEATURE                 Location/Qualifiers
source                  1..194
                        mol_type = protein
                        organism = synthetic construct
SEQUENCE: 6
MHKWILTWIL PTLLYRSCFH IICLVGTISL ACNDMTPEQM ATNVNCSSPE RHTRSYDYME  60
GGDIRVRRLF CRTQWYLRID KRGKVKGTQE MKNNYNIMEI RTVAVGIVAI KGVESEFYLC 120
MNKEGKLYAK KECNEDCNFK ELILENHYNT YASAKWTHNG GEMFVALNQK GIPVRGKKTK 180
KEQKTAHFLP MAIT                                                  194

SEQ ID NO: 7            moltype = AA   length = 194
FEATURE                 Location/Qualifiers
source                  1..194
                        mol_type = protein
                        organism = synthetic construct
SEQUENCE: 7
MHKWILTWIL PTLLYRSCFH IICLVGTISL ACNDMTPEQM ATNVNCSSPE RHTRSYDYME  60
GGDIRVRRLF CRTQWYLRID KRGKVKGTQE MKNNYNIMEI RTVAVGIVAI KGVESEFYLA 120
MNKEGELYAK KECNEDCNFK ELILENHYNT YASAKWTHNG GEMFVALNQK GIPVRGKKTK 180
KEQKTAHFLP MAIT                                                  194

SEQ ID NO: 8            moltype = AA   length = 194
FEATURE                 Location/Qualifiers
source                  1..194
                        mol_type = protein
                        organism = synthetic construct
SEQUENCE: 8
MHKWILTWIL PTLLYRSCFH IICLVGTISL ACNDMTPEQM ATNVNCSSPE RHTRSYDYME  60
GGDIRVRRLF CRTQWYLRID KRGKVKGTQE MKNNYNIMEI RTVAVGIVAI KGVESEFYLA 120
MNKEGDLYAK KECNEDCNFK ELILENHYNT YASAKWTHNG GEMFVALNQK GIPVRGKKTK 180
KEQKTAHFLP MAIT                                                  194

SEQ ID NO: 9            moltype = AA   length = 194
FEATURE                 Location/Qualifiers
source                  1..194
                        mol_type = protein
                        organism = synthetic construct
```

```
SEQUENCE: 9
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLA   120
MNKEGKLYAK KECNEDCNFK ELILENHYNT YASAKWTHNG GEMFVALNQK GIPVRGKETK   180
KEQKTAHFLP MAIT                                                    194

SEQ ID NO: 10           moltype = AA  length = 194
FEATURE                 Location/Qualifiers
source                  1..194
                        mol_type = protein
                        organism = synthetic construct
SEQUENCE: 10
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLA   120
MNKEGKLYAK KECNEDCNFK ELILENHYNT YASAKWTHNG GEMFVALNQK GIPVRGKDTK   180
KEQKTAHFLP MAIT                                                    194

SEQ ID NO: 11           moltype = AA  length = 194
FEATURE                 Location/Qualifiers
source                  1..194
                        mol_type = protein
                        organism = synthetic construct
SEQUENCE: 11
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC   120
MNKEGELYAK KECNEDCNFK ELILENHYNT YASAKWTHNG GEMFVALNQK GIPVRGKKTK   180
KEQKTAHFLP MAIT                                                    194

SEQ ID NO: 12           moltype = AA  length = 194
FEATURE                 Location/Qualifiers
source                  1..194
                        mol_type = protein
                        organism = synthetic construct
SEQUENCE: 12
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC   120
MNKEGDLYAK KECNEDCNFK ELILENHYNT YASAKWTHNG GEMFVALNQK GIPVRGKKTK   180
KEQKTAHFLP MAIT                                                    194

SEQ ID NO: 13           moltype = AA  length = 194
FEATURE                 Location/Qualifiers
source                  1..194
                        mol_type = protein
                        organism = synthetic construct
SEQUENCE: 13
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC   120
MNKEGKLYAK KECNEDCNFK ELILENHYNT YASAKWTHNG GEMFVALNQK GIPVRGKETK   180
KEQKTAHFLP MAIT                                                    194

SEQ ID NO: 14           moltype = AA  length = 194
FEATURE                 Location/Qualifiers
source                  1..194
                        mol_type = protein
                        organism = unidentified
SEQUENCE: 14
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC   120
MNKEGKLYAK KECNEDCNFK ELILENHYNT YASAKWTHNG GEMFVALNQK GIPVRGKDTK   180
KEQKTAHFLP MAIT                                                    194

SEQ ID NO: 15           moltype = AA  length = 194
FEATURE                 Location/Qualifiers
source                  1..194
                        mol_type = protein
                        organism = synthetic construct
SEQUENCE: 15
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLA   120
MNKEGELYAK KECNEDCNFK ELILENHYNT YASAKWTHNG GEMFVALNQK GIPVRGKETK   180
KEQKTAHFLP MAIT                                                    194

SEQ ID NO: 16           moltype = AA  length = 194
FEATURE                 Location/Qualifiers
source                  1..194
                        mol_type = protein
                        organism = synthetic construct
SEQUENCE: 16
MHKWILTWIL PTLLYRSCFH IICLVGTISL ACNDMTPEQM ATNVNCSSPE RHTRSYDYME    60
```

```
GGDIRVRRLF CRTQWYLRID KRGKVKGTQE MKNNYNIMEI RTVAVGIVAI KGVESEFYLA    120
MNKEGELYAK KECNEDCNFK ELILENHYNT YASAKWTHNG GEMFVALNQK GIPVRGKDTK    180
KEQKTAHFLP MAIT                                                     194

SEQ ID NO: 17           moltype = AA   length = 194
FEATURE                 Location/Qualifiers
source                  1..194
                        mol_type = protein
                        organism = synthetic construct
SEQUENCE: 17
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLA    120
MNKEGDLYAK KECNEDCNFK ELILENHYNT YASAKWTHNG GEMFVALNQK GIPVRGKETK    180
KEQKTAHFLP MAIT                                                     194

SEQ ID NO: 18           moltype = AA   length = 184
FEATURE                 Location/Qualifiers
source                  1..184
                        mol_type = protein
                        organism = synthetic construct
SEQUENCE: 18
PTLLYRSCFH IICLVGTISL ACNDMTPEQM ATNVNCSSPE RHTRSYDYME GGDIRVRRLF    60
CRTQWYLRID KRGKVKGTQE MKNNYNIMEI RTVAVGIVAI KGVESEFYLA MNKEGDLYAK    120
KECNEDCNFK ELILENHYNT YASAKWTHNG GEMFVALNQK GIPVRGKDTK KEQKTAHFLP    180
MAIT                                                                184

SEQ ID NO: 19           moltype = AA   length = 194
FEATURE                 Location/Qualifiers
source                  1..194
                        mol_type = protein
                        organism = synthetic construct
SEQUENCE: 19
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC    120
MNKEGELYAK KECNEDCNFK ELILENHYNT YASAKWTHNG GEMFVALNQK GIPVRGKETK    180
KEQKTAHFLP MAIT                                                     194

SEQ ID NO: 20           moltype = AA   length = 194
FEATURE                 Location/Qualifiers
source                  1..194
                        mol_type = protein
                        organism = synthetic construct
SEQUENCE: 20
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC    120
MNKEGDLYAK KECNEDCNFK ELILENHYNT YASAKWTHNG GEMFVALNQK GIPVRGKETK    180
KEQKTAHFLP MAIT                                                     194

SEQ ID NO: 21           moltype = AA   length = 194
FEATURE                 Location/Qualifiers
source                  1..194
                        mol_type = protein
                        organism = synthetic construct
SEQUENCE: 21
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC    120
MNKEGELYAK KECNEDCNFK ELILENHYNT YASAKWTHNG GEMFVALNQK GIPVRGKDTK    180
KEQKTAHFLP MAIT                                                     194

SEQ ID NO: 22           moltype = AA   length = 194
FEATURE                 Location/Qualifiers
source                  1..194
                        mol_type = protein
                        organism = synthetic construct
SEQUENCE: 22
MHKWILTWIL PTLLYRSCFH IICLVGTISL ACNDMTPEQM ATNVNCSSPE RHTRSYDYME    60
GGDIRVRRLF CRTQWYLRID KRGKVKGTQE MKNNYNIMEI RTVAVGIVAI KGVESEFYLC    120
MNKEGDLYAK KECNEDCNFK ELILENHYNT YASAKWTHNG GEMFVALNQK GIPVRGKDTK    180
KEQKTAHFLP MAIT                                                     194

SEQ ID NO: 23           moltype = AA   length = 164
FEATURE                 Location/Qualifiers
source                  1..164
                        mol_type = protein
                        organism = synthetic construct
SEQUENCE: 23
ACNDMTPEQM ATNVNCSSPE RHTRSYDYME GGDIRVRRLF CRTQWYLRID KRGKVKGTQE    60
MKNNYNIMEI RTVAVGIVAI KGVESEFYLA MNKEGKLYAK KECNEDCNFK ELILENHYNT    120
YASAKWTHNG GEMFVALNQK GIPVRGKKTK KEQKTAHFLP MAIT                     164
```

```
SEQ ID NO: 24           moltype = AA  length = 141
FEATURE                 Location/Qualifiers
source                  1..141
                        mol_type = protein
                        organism = synthetic construct
SEQUENCE: 24
MSYDYMEGGD IRVRRLFCRT QWYLRIDKRG KVKGTQEMKN NYNIMEIRTV AVGIVAIKGV   60
ESEFYLAMNK EGKLYAKKEC NEDCNFKELI LENHYNTYAS AKWTHNGGEM FVALNQKGIP  120
VRGKKTKKEQ KTAHFLPMAI T                                           141

SEQ ID NO: 25           moltype = AA  length = 141
FEATURE                 Location/Qualifiers
source                  1..141
                        mol_type = protein
                        organism = synthetic construct
SEQUENCE: 25
MSYDYMEGGD IRVRRLFCRT QWYLRIDKRG KVKGTQEMKN NYNIMEIRTV AVGIVAIKGV   60
ESEFYLCMNK EGKLYAKKEC NEDCNFKELI LENHYNTYAS AKWTHNGGEM FVALNQKGIP  120
VRGKKTKKEQ KTAHFLPMAI T                                           141

SEQ ID NO: 26           moltype = AA  length = 141
FEATURE                 Location/Qualifiers
source                  1..141
                        mol_type = protein
                        organism = synthetic construct
SEQUENCE: 26
MSYDYMEGGD IRVRRLFCRT QWYLRIDKRG KVKGTQEMKN NYNIMEIRTV AVGIVAIKGV   60
ESEFYLCMNK EGELYAKKEC NEDCNFKELI LENHYNTYAS AKWTHNGGEM FVALNQKGIP  120
VRGKKTKKEQ KTAHFLPMAI T                                           141

SEQ ID NO: 27           moltype = AA  length = 141
FEATURE                 Location/Qualifiers
source                  1..141
                        mol_type = protein
                        organism = synthetic construct
SEQUENCE: 27
MSYDYMEGGD IRVRRLFCRT QWYLRIDKRG KVKGTQEMKN NYNIMEIRTV AVGIVAIKGV   60
ESEFYLCMNK EGKLYAKKEC NEDCNFKELI LENHYNTYAS AKWTHNGGEM FVALNQKGIP  120
VRGKETKKEQ KTAHFLPMAI T                                           141

SEQ ID NO: 28           moltype = AA  length = 141
FEATURE                 Location/Qualifiers
source                  1..141
                        mol_type = protein
                        organism = synthetic construct
SEQUENCE: 28
MSYDYMEGGD IRVRRLFCRT QWYLRIDKRG KVKGTQEMKN NYNIMEIRTV AVGIVAIKGV   60
ESEFYLCMNK EGELYAKKEC NEDCNFKELI LENHYNTYAS AKWTHNGGEM FVALNQKGIP  120
VRGKETKKEQ KTAHFLPMAI T                                           141
```